(12) United States Patent
Yura et al.

(10) Patent No.: US 11,837,699 B2
(45) Date of Patent: Dec. 5, 2023

(54) ALL-SOLID LITHIUM BATTERY AND METHOD OF MANUFACTURING SAME

(71) Applicant: NGK INSULATORS, LTD., Nagoya (JP)

(72) Inventors: Yukinobu Yura, Nagoya (JP); Yukihisa Takeuchi, Nagoya (JP); Yosuke Sato, Nagoya (JP); Toshihiro Yoshida, Nagoya (JP); Yuji Katsuda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 645 days.

(21) Appl. No.: 16/864,550

(22) Filed: May 1, 2020

(65) Prior Publication Data

US 2020/0259217 A1  Aug. 13, 2020

Related U.S. Application Data

(63) Continuation of application No. PCT/JP2018/040687, filed on Nov. 1, 2018.

(30) Foreign Application Priority Data

Nov. 10, 2017 (JP) ................................ 2017-217195
Dec. 8, 2017 (JP) ................................ 2017-235918

(51) Int. Cl.
*H01M 10/0585* (2010.01)
*H01M 10/0525* (2010.01)
(Continued)

(52) U.S. Cl.
CPC ....... *H01M 10/0585* (2013.01); *H01M 4/485* (2013.01); *H01M 10/0525* (2013.01);
(Continued)

(58) Field of Classification Search
CPC ......... H01M 10/0585; H01M 10/0525; H01M 10/0562; H01M 4/485; H01M 2300/0068; H01M 2004/021; H01M 50/431
See application file for complete search history.

(56) References Cited

U.S. PATENT DOCUMENTS 10,454,109 B2   10/2019   Ohira et al.
2009/0197178 A1*  8/2009  Inda ................. H01M 10/0562
                                                     429/231.95
(Continued)

FOREIGN PATENT DOCUMENTS

EP   3 540 843 A1   9/2019
EP   3 709 423 A1   9/2020
(Continued)

OTHER PUBLICATIONS

International Search Report and Written Opinion (Application No. PCT/JP2018/040687) dated Feb. 5, 2019 (with English translation).

(Continued)

*Primary Examiner* — Osei K Amponsah
(74) *Attorney, Agent, or Firm* — BURR PATENT LAW, PLLC

(57) ABSTRACT

Provided is an all-solid lithium battery including: a low-angle oriented positive electrode plate that is a lithium complex oxide sintered plate having a porosity of 10 to 50%; a negative electrode plate containing Ti and capable of intercalating and deintercalating lithium ions at 0.4 V or higher (vs. Li/Li$^+$); and a solid electrolyte having a melting point lower than the melting point or pyrolytic temperature of the oriented positive electrode plate or the negative electrode plate, wherein at least 30% of pores in the oriented positive electrode plate is filled with the solid electrolyte in an observation of a cross-section perpendicular to a main face of the oriented positive electrode plate.

24 Claims, 4 Drawing Sheets

(51) Int. Cl.
  *H01M 4/485* (2010.01)
  *H01M 10/0562* (2010.01)
  *H01M 50/431* (2021.01)
  *H01M 50/434* (2021.01)
  *H01M 50/489* (2021.01)
  *H01M 4/02* (2006.01)

(52) U.S. Cl.
  CPC ..... *H01M 10/0562* (2013.01); *H01M 50/431* (2021.01); *H01M 50/434* (2021.01); *H01M 50/489* (2021.01); *H01M 2004/021* (2013.01); *H01M 2300/0068* (2013.01)

(56) References Cited

U.S. PATENT DOCUMENTS

2017/0033398 A1* 2/2017 Yokoyama .......... H01M 4/1391
2017/0333981 A1 11/2017 Hajas

FOREIGN PATENT DOCUMENTS

| JP | 2015-185337 A1 | 10/2015 |
| JP | 2017-033689 A1 | 2/2017 |
| JP | 2017-142885 A1 | 8/2017 |
| WO | 2012/112229 A2 | 8/2012 |
| WO | 2017/146088 A1 | 8/2017 |

OTHER PUBLICATIONS

Yutaro Li et al., "Flourine-Doped Antiperovskite Electrolyte for All-Solid-State Lithium-Ion Batteries", *Agnew. Chem. Int. Ed.*, 2016, 55, pp. 9965-9968.
Extended European Search Report (Application No. 18 875 769.4) dated Jul. 22, 2021.

* cited by examiner

ALL-SOLID LITHIUM BATTERY AND METHOD OF MANUFACTURING SAME

CROSS-REFERENCE TO RELATED APPLICATIONS

This application is a continuation application of PCT/JP2018/040687 filed Nov. 1, 2018, which claims priority to Japanese Patent Application No. 2017-217195 filed Nov. 10, 2017 and Japanese Patent Application No. 2017-235918 filed Dec. 8, 2017, the entire contents all of which are incorporated herein by reference.

BACKGROUND OF THE INVENTION

1. Field of the Invention

The present invention relates to a secondary all-solid lithium battery (hereinafter referred to as an all-solid lithium battery) and a method of manufacturing the all-solid lithium battery.

2. Description of the Related Art

Powder-dispersed positive electrodes are widely known as layers of positive electrode active material for secondary lithium batteries (also referred to as secondary lithium ion batteries), and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, the powder-dispersed positive electrode should be greatly improved from the viewpoint of the capacity and charge/discharge efficiency.

Some attempts have been made to improve the capacity and charge/discharge efficiency by positive electrodes or layers of positive electrode active material composed of sintered plate of lithium complex oxide. In this case, since the positive electrode or the layer of positive electrode active material contains no binder, high capacity and satisfactory charge/discharge efficiency can be expected due to a high packing density of lithium complex oxide. For example, PTL 1 (WO2017/146088) discloses a low-angle oriented positive electrode plate of an all-solid lithium battery including a solid electrolyte layer. The positive electrode plate includes multiple primary grains composed of lithium complex oxide, for example, lithium cobaltate ($LiCoO_2$). Crystal planes (003) of the primary grains are oriented by a low mean angle of more than 0° to 30° relative to a main face of the positive electrode plate. Such orientation can mitigate the stress generated at an interface between the positive electrode plate and the solid electrolyte layer during charging/discharging cycles. In other words, the main face of the positive electrode plate has a low expansion-contraction rate to reduce the stress generated at the interface between the positive electrode plate and the solid electrolyte layer. Defects in the solid electrolyte layer and separation of the positive electrode plate from the solid electrolyte layer can thereby be reduced.

Negative electrodes or negative electrode active material layers are also known that are composed of lithium complex oxide sintered plates. For example, PTL 2 (JP2015-185337A) discloses an all-solid battery including a positive electrode, a negative electrode, and a solid electrolyte layer. The positive electrode or negative electrode is composed of a lithium titanate ($Li_4Ti_5O_{12}$) sintered body. The sintered body disclosed in PTL 2 is highly dense and has a relative denseness of 90% or more. The high relative denseness reflects the general comprehension that the positive and negative electrodes are preferably dense for enhanced energy densities of all-solid secondary batteries.

Antiperovskite materials have been proposed for highly lithium-ion-conductive solid electrolytes. For example, PTL 3 (WO2012/112229A) discloses that $Li_3OCl$ and $Li_{(3-x)}M_{x/2}OA$ serve as solid electrolytes having superior lithium ion conductivity, where $0 \leq x \leq 0.8$; M represents at least one element selected from the group consisting of Mg, Ca, Ba, and Sr; and A represents at least one element selected from the group consisting of F, Cl, Br, and I. NPL 1 (Yutao Li et al., "Fluorine-Doped Antiperovskite Electrolyte for All-Solid-State Lithium-Ion Batteries", Angew. Chem. Int. Ed. 2016, 55, 9965-9968) discloses that $Li_2OHX$ is preferred as a solid electrolyte for an all-solid secondary battery, where X represents Cl or Br. NPL 1 also discloses that a compound produced by doping of $Li_2OHCl$ with fluorine and partial substitution of $F^-$ for $OH^-$ has electrochemical stability suitable for the all-solid secondary battery.

CITATION LIST

Patent Literatures

PTL1: WO2017/146088A
PTL2: JP2015-185337A
PTL3: WO2012/112229A

Non-Patent Literature

NPL1: Yutao Li et al., "Fluorine-Doped Antiperovskite Electrolyte for All-Solid-State Lithium-Ion Batteries", Angew. Chem. Int. Ed. 2016, 55, 9965-9968

SUMMARY OF THE INVENTION

The present inventors had had an idea that an all-solid lithium battery with high performance could be manufactured with a low-angle oriented positive electrode plate, a negative electrode plate, and a solid electrolyte as described above, in the earliest years. Such all-solid lithium batteries had been practically manufactured. Unfortunately, it was found that some batteries among the resultant batteries might have high battery resistance and significantly poor high-rate performance. Such disadvantages were inherent in the above configuration of the all-solid lithium battery including a solid electrolyte, such as $Li_3OCl$.

The present inventors have now found that the battery resistance and the high-rate performance during charge/discharge cycles can be remarkably improved and the production yield can be significantly enhanced in an all-solid lithium battery including a low-angle oriented positive electrode plate and a specific solid electrolyte by adjusting the porosity in the low-angle oriented positive electrode plates to 10 to 50% and filling 30% or more of the pores in the plate with the solid electrolyte.

Accordingly, an object of the present invention is to remarkably improve the battery resistance and the high-rate performance during charge/discharge cycles and to significantly enhance the production yield in an all-solid lithium battery including a low-angle oriented positive electrode plate and a specific solid electrolyte.

According to an aspect of the present invention, there is provided an all-solid lithium battery comprising:
- an oriented positive electrode plate that is a lithium complex oxide sintered plate having a porosity of 10 to 50%, wherein the lithium complex oxide sintered plate contains a plurality of primary grains composed of lithium complex oxide, and the primary grains are oriented at a mean orientation angle of more than 0° to 30° to a main face of the oriented positive electrode plate;
- a negative electrode plate containing Ti and capable of intercalating and deintercalating lithium ions at 0.4 V or higher (vs. Li/Li$^+$); and
- a solid electrolyte having a melting point lower than a melting point or pyrolytic temperature of the oriented positive electrode plate or the negative electrode plate, wherein at least 30% of pores in the oriented positive electrode plate is filled with the solid electrolyte in an observation of a cross-section perpendicular to a main face of the oriented positive electrode plate.

According to another aspect of the present invention, there is provided a method of producing the all-solid lithium battery, comprising the steps of:
- placing solid electrolyte powder having a melting point lower than the melting point or pyrolytic temperature of the oriented positive electrode plate or the negative electrode plate on one of the oriented positive electrode plate and the negative electrode plate;
- placing the other of the oriented positive electrode plate and the negative electrode plate on the solid electrolyte powder;
- pressing the negative electrode plate toward the oriented positive electrode plate, or the oriented positive electrode plate toward the negative electrode plate at 100 to 600° C. to melt the solid electrolyte powder and permeate the melt into the pores in the oriented positive electrode plate and/or the negative electrode plate; and
- spontaneously or controllably cooling the oriented positive electrode plate, the molten electrolyte and the negative electrode plate to solidify the molten electrolyte.

DETAILED DESCRIPTION OF THE INVENTION

All-Solid Lithium Battery

Figure 1:
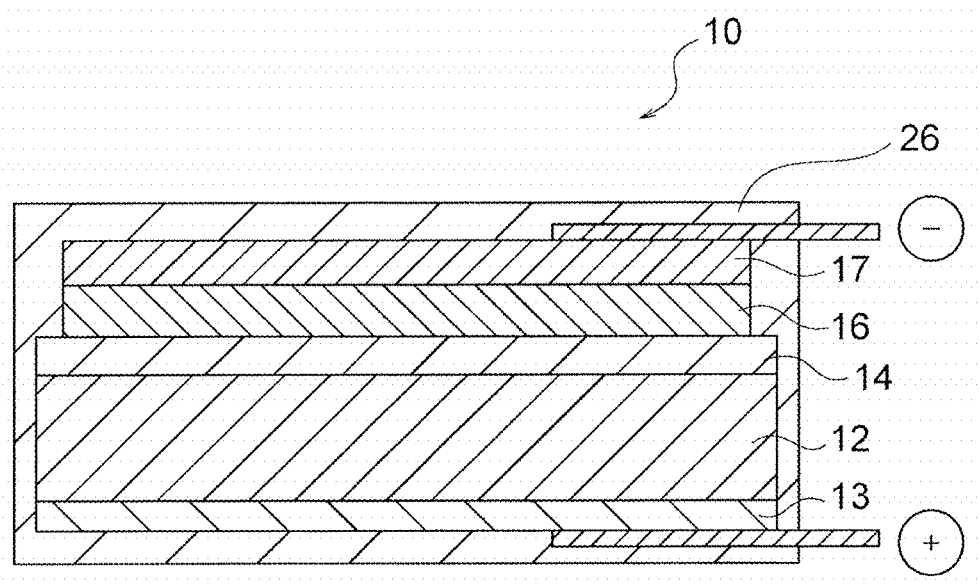
FIG. 1 is a schematic cross-sectional view illustrating an exemplary all-solid lithium battery of the present invention.

FIG. 1 schematically illustrates an exemplary all-solid lithium battery of the present invention. The all-solid lithium battery 10 shown in FIG. 1 includes an oriented positive electrode plate 12, a solid electrolyte 14, and a negative electrode plate 16. The oriented positive electrode plate 12 is a lithium complex oxide sintered plate having a porosity of 10 to 50%. The lithium complex oxide sintered plate contains a plurality of primary grains composed of lithium complex oxide, and the primary grains have a mean orientation angle of more than 0° to 30° to a main face of the oriented positive electrode plate. This plate is a so-called "low-angle oriented positive electrode plate". The solid electrolyte 14 has a melting point lower than the melting point or pyrolytic temperature of the oriented positive electrode plate 12 or the negative electrode plate 16. The negative electrode plate 16 is capable of intercalating and deintercalating lithium ions at 0.4 V or higher (vs. Li/Li$^+$), and contains titanium (Ti). In the observation of a cross-section perpendicular to a main face of the oriented positive electrode plate 12, at least 30% of the pores contained in the oriented positive electrode plate 12 are filled with the solid electrolyte 14. As described above, the battery resistance and high-rate performance during charge/discharge cycles can be remarkably improved and the production yield can be significantly enhanced in the all-solid lithium battery including a low-angle oriented positive electrode plate and a specific solid electrolyte through adjustment of the porosity in the low-angle oriented positive electrode plate to 10 to 50% and filling 30% or more of the pores in the plate with the solid electrolyte.

As described above, the present inventors had had an idea that an all-solid lithium battery with high performance could be manufactured with a low-angle oriented positive electrode plate, a negative electrode plate, and a solid electrolyte, as disclosed in PTLs 1 to 3, in the earliest years. Such all-solid lithium batteries had been practically manufactured. Unfortunately, it was found that some batteries among the resultant batteries had high battery resistance and significantly poor high-rate performance. Although no cause of such disadvantages is clear, a plausible cause is as follows: Since a plurality of primary platy grains constituting the low-angle oriented positive electrode plate (specifically, the (003) plane of these grains) are oriented by a mean orientation angle of 30° or less (e.g., about 15°) to a main face of the oriented positive electrode plate, it is believed to be one of causes of the disadvantage that the surface microstructure on the oriented positive electrode plate is even (compared with the high-angle oriented or unoriented positive electrode plate), resulting in predominant exposure of the (003) plane corresponding to a main face of primary platy grain. In other words, the solid electrolyte is desired to be preliminarily softened or melted in order to increase adhesiveness at the interfaces between the positive electrode plate and the solid electrolyte and between the negative electrode plate and the solid electrolyte when batteries are manufactured using battery components as described above; however, the softened or melted electrolyte has poor wettability with the (003) plane that is predominantly exposed on the surface of the positive electrode plate, resulting in poor interfacial contact. In contrast, in the use of an unoriented positive electrode plate having random orientation angles of the primary grains, interfacial separation occurs due to the stress generated during intercalation and deintercalation of lithium ions and breakdown of batteries may occur, as disclosed in PTL 1. These problems can be advantageously solved by adjustment of porosity in the low-angle oriented positive electrode plate to 10 to 50% and filling 30% or more of the pores in the plate with the solid electrolyte. That is, the battery resistance and high-rate performance during charge/discharge cycles can be remarkably improved and the production yield of batteries can be significantly enhanced. Although the mechanism providing these unexpected improvements is not clear, a plausible speculation is that the solid electrolyte penetrates into and permeates the pores in the oriented positive electrode plate, resulting in strong interfacial contact between the solid electrolyte and the planes other than the (003) plane (i.e., crystalline planes having good wettability with the solid electrolyte). In other words, since the pores have random shapes inside the oriented positive electrode plate, the solid electrolyte can sufficiently come in contact with the planes other than the (003) plane in spite of predominant exposure of the (003) plane on the surface of the oriented positive electrode plate.

As described above, in the observation of a cross-section perpendicular to a main face of the oriented positive electrode plate 12, 30% or more, preferably 50% or more, more preferably 60% or more, further more preferably 70% or more of the pores contained in the oriented positive electrode plate 12 is filled with the solid electrolyte 14. Such a filling rate can further reduce the battery resistance and improve the high-rate performance during charge/discharge cycles, and enhance the production yield of batteries. In the use of an inorganic solid electrolyte, a higher filling rate of the electrolyte is preferred in the pores of the positive electrode plate 12. Although the filling rate is ideally 100%, it is practically 98% or less, more practically 95% or less. The filling rate (%) of the electrolyte in the pores can be determined through (i) polishing of the battery with a cross section polisher (CP), (ii) SEM observation and EDX analysis of the resultant cross-section of the oriented positive electrode plate at a specific magnification (e.g., 1000 folds) and a specific field of view (e.g., 125 µm by 125 µm), and subsequent image analysis, (iii) measurement of the area of pores filled with the solid electrolyte and the overall area of pores, and (iv) dividing the area of pores filled with the solid electrolyte by the overall area of pores and multiplying the resulting value by 100.

In the observation of a cross-section perpendicular to a main face of oriented positive electrode plate 12, the solid electrolyte 14 is in contact with preferably at least 30%, more preferably at least 40%, further more preferably at least 50% of the outer peripheral length of pores contained in the oriented positive electrode plate 12. Such a contact rate can further reduce the battery resistance and improve the high-rate performance during charge/discharge cycles, and further enhance the production yield of batteries. These advantages are presumably based on a further increase in the contact area between the solid electrolyte and the oriented positive electrode plate. In the use of an inorganic solid electrolyte, a higher contact rate of the electrolyte is preferred in the pores of positive electrode plate 12. Although the contact rate is ideally 100%, it is practically 98% or less, more practically 95% or less. The contact rate (%) between the outer periphery of pores and the solid electrolyte can be determined through (i) polishing of the battery with a cross section polisher (CP), (ii) SEM observation and EDX analysis of the resultant cross-section of the oriented positive electrode plate at a specific magnification (e.g., 1000 folds) and a specific field of view (e.g., 125 µm by 125 µm), and subsequent image analysis, (iii) measurement of contact length between grains constituting the outer periphery of pores (i.e., grains adjacent to pores) and the solid electrolyte, and the outer peripheral length of pores, and (iv) dividing the contact length between the grains constituting the outer periphery of pores and the solid electrolyte by the outer peripheral length of pores and multiplying the resulting value by 100.

In the observation of a cross-section perpendicular to a main face of oriented positive electrode plate 12, the solid electrolyte 14 is in contact with preferably at least 20%, more preferably at least 30% of the planes other than the (003) plane of lithium complex oxide at the surface of pores included in the oriented positive electrode plate 12. Such a contact rate can further reduce the battery resistance and improve the high-rate performance during charge/discharge cycles, and further enhance the production yield of batteries. These advantages are presumably based on the formation of superior interfacial contact due to high wettability of the planes other than the (003) plane to the solid electrolyte used in the present invention. The upper limit of the contact rate, which is in contact with the solid electrolyte 14, of the planes other than the (003) plane in the lithium complex oxide is not limited. The rate is practically 98% or less, more practically 95% or less. The contact rate (%) between the planes other than the (003) plane and the solid electrolyte at the surface of pores can be determined through (i) polishing of the battery with a cross section polisher (CP), (ii) SEM observation, EDX analysis and EBSD measurement of the resultant cross-section of the oriented positive electrode plate at a specific magnification (e.g., 1000 folds) and a specific field of view (e.g., 125 µm by 125 µm), (iii) determination of whether the crystal planes of grains exposed at the surface of pores are the (003) planes or the planes other than the (003) plane based on the EBSD results, and measurement of the first outer peripheral length of pores where the solid electrolyte is in contact with the planes other than the (003) plane and the second outer peripheral length of pores where the planes other than the (003) plane are exposed, and (iv) dividing the first outer peripheral length of pores where the solid electrolyte is in contact with the planes other than the (003) plane by the second outer peripheral length of pores where the planes other than the (003) plane are exposed and multiplying the resulting value by 100.

Figure 2:
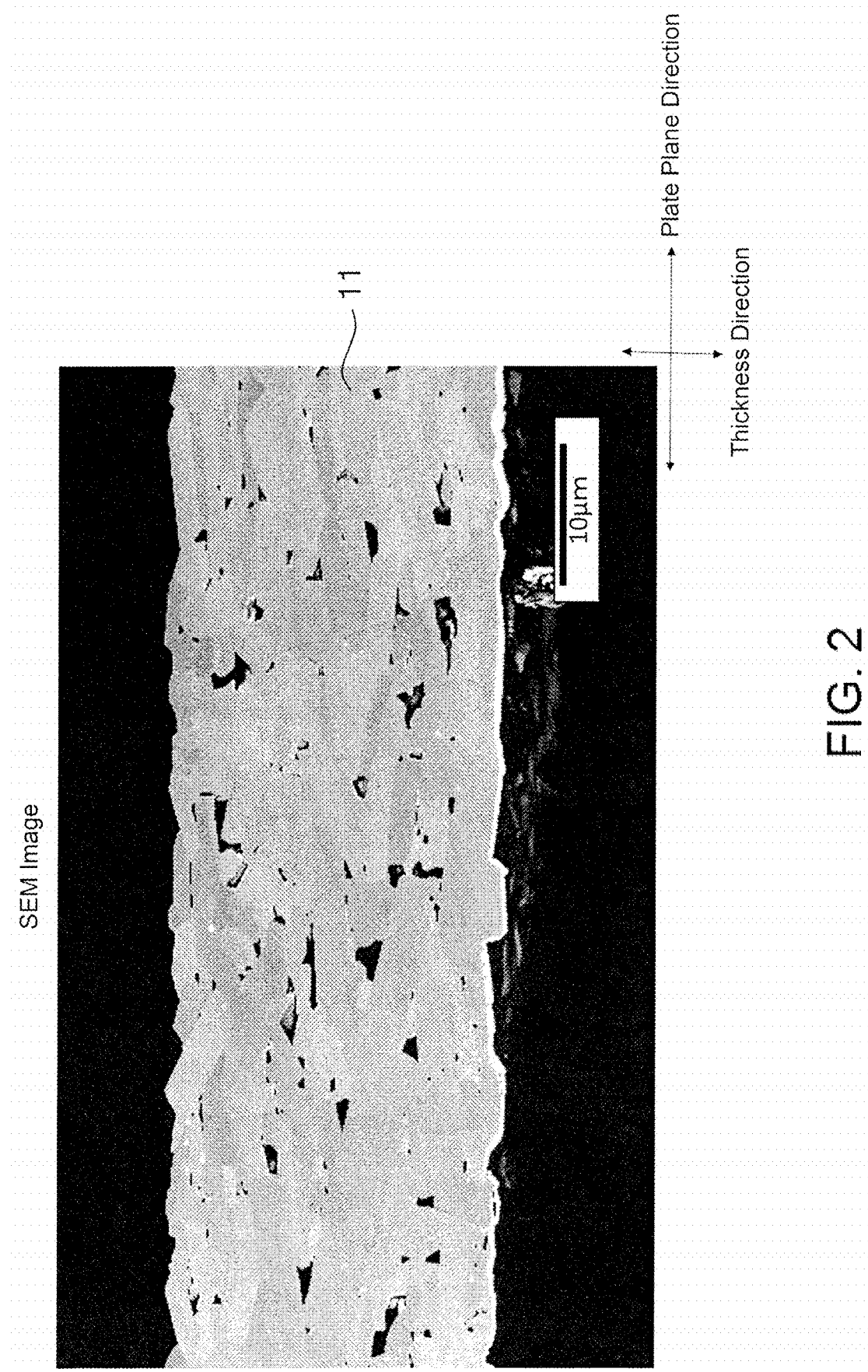
FIG. 2 is an SEM image illustrating an exemplary cross-section perpendicular to a main face of an oriented positive electrode plate.
Figure 3:
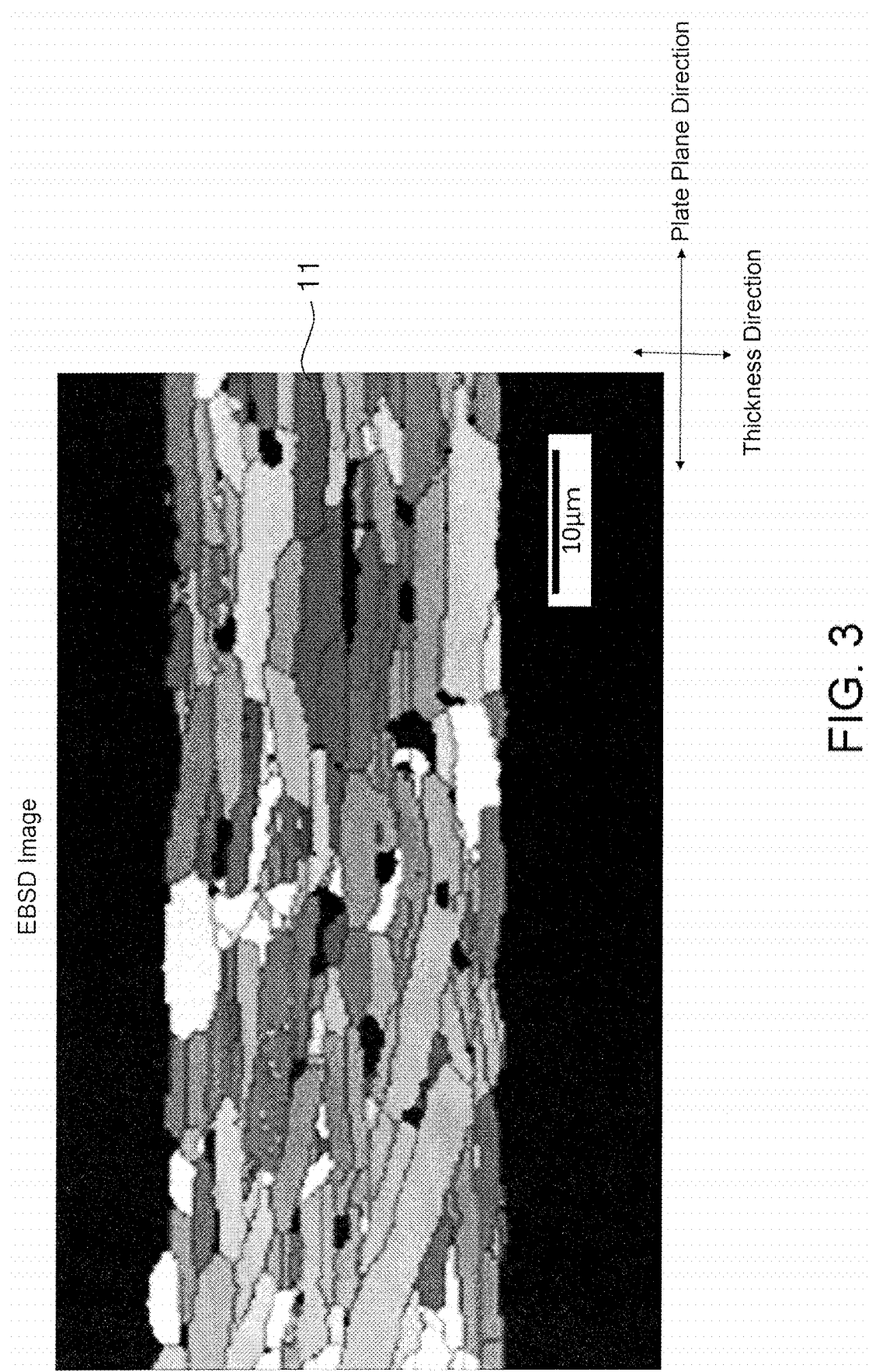
FIG. 3 is an EBSD image in the cross-section of the oriented positive electrode plate shown in FIG. 2.
Figure 4:
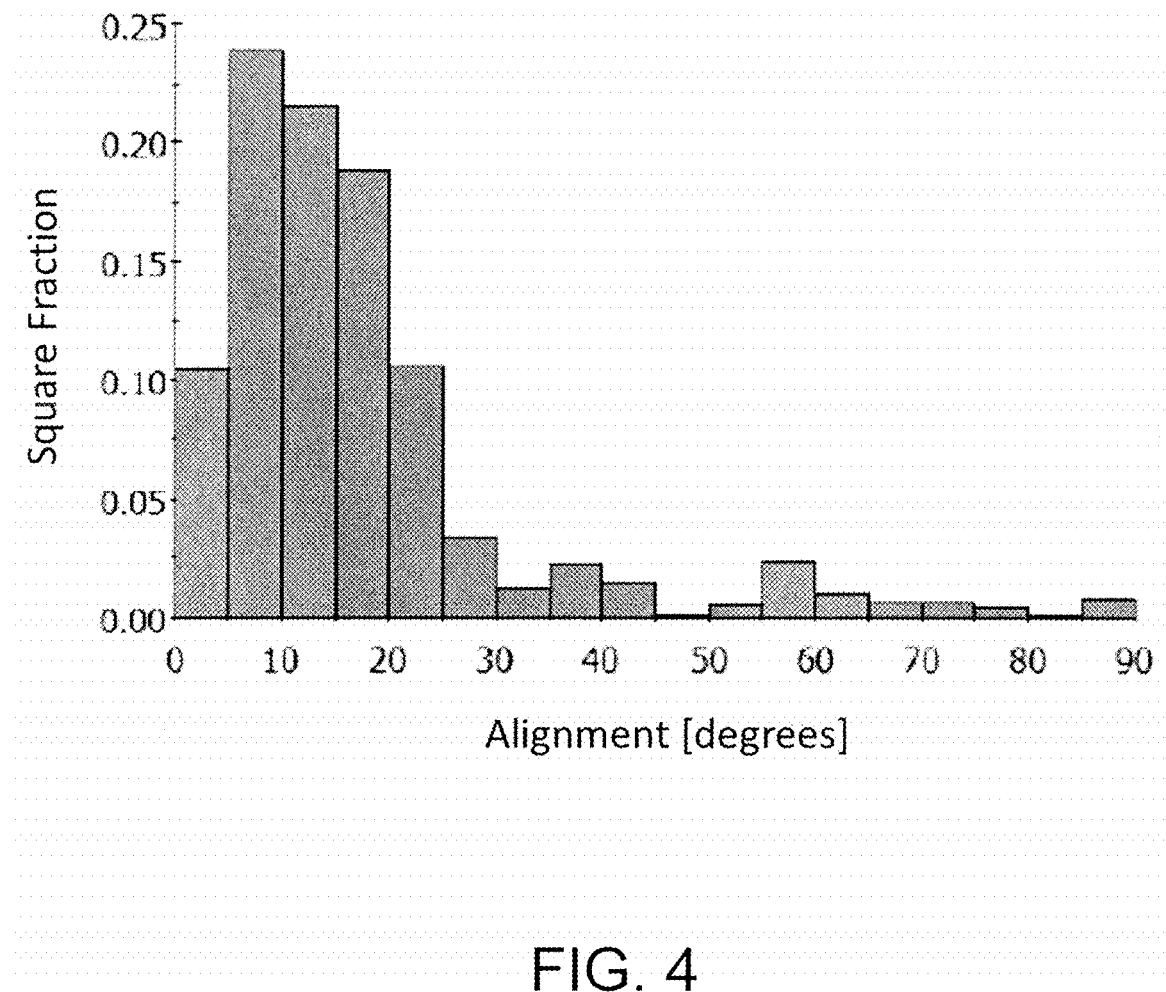
FIG. 4 is an area-based histogram illustrating the distribution of orientation angles of primary grains in the EBSD image shown in FIG. 3.

The oriented positive electrode plate 12 is a lithium complex oxide sintered plate. The lithium complex oxide sintered plate includes a plurality of primary grains composed of lithium complex oxide having a layered rock salt structure, and the primary grains are oriented by a mean orientation angle of more than 0° to 30° to a main face of oriented positive electrode plate. FIG. 2 illustrates an exemplary cross-sectional SEM image perpendicular to a main face of the oriented positive electrode plate 12, and FIG. 3 illustrates a cross-sectional electron backscatter diffraction (EBSD) image perpendicular to a main face of the oriented positive electrode plate 12. FIG. 4 is an area-based histogram illustrating the distribution of orientation angles of primary grains 11 in the EBSD image of FIG. 3. In the EBSD image shown in FIG. 3, discontinuity of the crystal orientation can be observed. In FIG. 3, the orientation angle of each primary grain 11 is determined by the shade of color, and a darker shade indicates a smaller orientation angle. The orientation angle is a tilt angle of the (003) plane of each primary grain 11 to a main face of the plate. In FIGS. 2 and 3, black portions inside the oriented positive electrode plate 12 indicate pores.

The oriented positive electrode plate 12 is an oriented sintered plate composed of multiple primary grains 11 bonded to each other. Each primary grain 11 is mainly in a platy shape, and may be formed in, for example, a cuboid shape, a cubic shape, and a spherical shape. The cross-sectional shape of each primary grain 11 may be a rectangle, a polygon other than a rectangle, a circle, an ellipse, or any other complicated shape.

Each primary grain 11 is composed of lithium complex oxide. The lithium complex oxide is an oxide represented by $Li_xMO_2$ (0.05<x<1.10, M is at least one transition metal, and M typically contains at least one of Co, Ni and Mn). The lithium complex oxide has a layered rock salt structure. The layered rock salt structure is a crystal structure in which a lithium layer and a transition metal layer other than lithium are alternately stacked with an oxygen layer therebetween, i.e., a crystal structure in which a transition metal ion layer and a lithium single layer are alternately stacked with oxide ions therebetween (typically an $\alpha$-NaFeO$_2$ structure, i.e., a structure in which transition metals and lithium metals are regularly disposed along the [111] axis of a cubic rock salt structure). Examples of lithium complex oxides include Li$_x$CoO$_2$ (lithium cobaltate), Li$_x$NiO$_2$ (lithium nickelate), Li$_x$MnO$_2$ (lithium manganate), Li$_x$NiMnO$_2$ (lithium nickel manganate), Li$_x$NiCoO$_2$ (lithium nickel cobaltate), Li$_x$CoNiMnO$_2$ (lithium cobalt nickel manganate), and Li$_x$CoMnO$_2$ (lithium cobalt manganate), and particularly preferably, Li$_x$CoO$_2$ (lithium cobaltate, typically LiCoO$_2$). The lithium complex oxide may contain at least one element selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W.

As shown in FIGS. 3 and 4, the averaged value of the orientation angles, i.e., the mean orientation angle of primary grains 11 is more than 0° to 30°. This angle range provides the following advantages 1) to 3). 1) Since each primary grain 11 greatly tilts from the thickness direction of the positive electrode plate, the adhesiveness between the individual primary grains can be improved. This configuration can improve the lithium ion conductivity between one primary grain 11 and another primary grain 11 adjacent on two ends of the one primary grain 11 in the main face direction, resulting in an improvement in high-rate performance. 2) Cycle characteristics can be improved. In detail, the expansion and contraction of the oriented positive plate 12 accompanied by the expansion and contraction of each primary grain 11 in the direction perpendicular to the (003) plane depending on intercalation and deintercalation of lithium ions can be decreased in the main face direction by smaller orientation angle of the (003) plane to the main face direction, resulting in a reduction in stress generated between the oriented positive plate 12 and the solid electrolyte 14. 3) The high-rate performance can be further improved. This further improvement is caused by smooth intercalation and deintercalation of lithium ions in the oriented positive electrode 12, because the expansion and contraction of oriented positive electrode plate 12 proceeds more dominantly in the thickness direction than in the main face direction and thereby lithium ions can intercalate and deintercalate smoothly.

The mean orientation angle of primary grains 11 is determined through (i) polishing of the oriented positive electrode plate with a cross section polisher (CP), (ii) EBSD analysis of the resultant cross-section of oriented positive electrode plate at a specific magnification (e.g., 1000 folds) and a specific field of view (e.g., 125 µm by 125 µm), (iii) measurement of angles between the (003) plane of primary grains and a main face of oriented positive electrode plate (i.e., tilt of crystal orientation from the (003) plane) as orientation angles based on all grains specified in the resultant EBSD image, and (iv) averaging of all the resulting angles to be a mean orientation angle. The mean orientation angle of the primary grains 11 is preferably 30° or less, and more preferably 25° or less from the viewpoint of a further improvement in high-rate performance. The mean orientation angle of the primary grains 11 is preferably 2° or more, and more preferably 5° or more from the viewpoint of a further improvement in high-rate performance.

As shown in FIG. 4, the orientation angle of each primary grain 11 may be widely distributed from 0° to 90°, and most of the orientation angles are preferably distributed in a region of more than 00 to 30°. In other words, when the cross-section of the oriented sintered plate constituting the oriented positive electrode plate 12 is analyzed in the EBSD image, the total area of primary grains 11 that have the orientation angle of more than 0° to 30° to a main face of the oriented positive electrode plate 12 (hereinafter, referred to as low-angle primary grains) is preferably 70% or more, and more preferably 80% or more of the total area of the primary grains 11 (specifically, 30 primary grains 11 used in calculation of the mean orientation angle) included in the cross-section. This configuration can increase the proportion of the primary grains 11 having higher mutual adhesiveness, thereby high-rate performance can be further improved. In addition, the total area of the low-angle primary grains having an orientation angle of 20° or less is more preferably 50% or more of the total area of the 30 primary grains 11 used in the calculation of the mean orientation angle. Furthermore, the total area of the low-angle primary grains having an orientation angle of 10° or less is more preferably 15% or more of the total area of the 30 primary grains 11 used in the calculation of the mean orientation angle.

Since each primary grain 11 is mainly platy, the cross-section of each primary grain 11 respectively extends in a predetermined direction as shown in FIGS. 2 and 3, and typically has a substantially rectangular shape. In other words, when the cross-section of the oriented sintered plate is analyzed in the EBSD image, the total area of primary grains 11 that have an aspect ratio of 4 or more among the primary grains 11 included in the analyzed cross-section is preferably 70% or more, and more preferably 80% or more of the total area of the primary grains 11 (specifically, 30 primary grains 11 used in calculation of the mean orientation angle) included in the cross-section. In detail, the configuration shown in the EBSD image of FIG. 3 can increase the mutual adhesiveness between the primary grains 11, resulting in a further improvement of high-rate performance. The aspect ratio of the primary grains 11 is a value determined by dividing the maximum Feret diameter by the minimum Feret diameter of the primary grains 11. The maximum Feret diameter is the maximum distance between two parallel straight lines by which the primary grains 11 are sandwiched in the EBSD image from cross-sectional observation. The minimum Feret diameter is the minimum distance between two parallel straight lines by which the primary grains 11 are sandwiched.

A plurality of primary grains constituting the oriented sintered plate has a mean grain diameter of preferably 20 µm or less. Specifically, the primary grains 11 has a mean grain diameter of preferably 20 µm or less, more preferably 15 µm or less. Such a diameter range can reduce the distance for lithium ions to travel in the primary grains 11, resulting in a further improvement in high-rate performance. For example, in a charge state, the lithium ions move from the inside of primary grains 11 to the solid electrolyte in the pores of the positive electrode, further pass through the film-shaped (or planar) solid electrolyte 14 and move into the grains of negative electrode as a counter electrode. In this mechanism, since the traveling distance of lithium ions can be reduced in the positive electrode including the primary grains 11 where the solid electrolyte in the pores serve as a delaying factor, and thereby high-rate performance can be improved. The mean grain diameter of primary grains 11 can be measured by the analysis of a cross-sectional SEM image of the sintered plate. For example, the sintered plate is processed with a cross section polisher (CP) to expose a polished cross-section. The polished cross-section is observed by SEM (scanning electron microscopy) at a specific magnification (e.g., 1000 folds)

and a specific field of view (e.g., 125 µm by 125 µm). In this case, the field of view is selected such that 20 or more primary grains are located in this field. In the resultant SEM image, circumscribed circles are drawn for all primary grains and the diameters of circumscribed circles are measured and averaged to be a mean grain diameter of primary grains.

The lithium complex oxide sintered plate constituting the oriented positive electrode plate 12 has a porosity of 10 to 50%, preferably 10 to 40%, more preferably 12 to 35%, further more preferably 15 to 30%. Such a porosity range can sufficiently fill the pores in the oriented positive electrode plate 12 with the solid electrolyte 14, resulting in a significant reduction in the battery resistance and an improvement in the high-rate performance during charge/discharge cycles, and a remarkable enhancement in the production yield of batteries. The porosity in the oriented positive electrode plate 12 indicates the volume rate of pores in the oriented positive electrode plate 12. This porosity can be determined by the analysis in a cross-sectional SEM image of the oriented positive electrode plate. For example, the porosity (%) can be determined through (i) processing of the sintered plate with a cross section polisher (CP) to expose a polished cross-section, (ii) scanning electron microscope (SEM) observation of the polished cross-section at a specific magnification (e.g., 1000 folds) and a specific field of view (e.g., 125 µm by 125 µm), and (iii) analysis of the resultant SEM image, and dividing the total area of all the pores in the field of view by the total area (i.e., cross-sectional area) of the sintered plate in the field of view and further multiplying the resulting value by 100.

The oriented positive electrode plate 12 has a thickness of 30 µm or more, preferably 40 µm or more, particularly preferably 50 µm or more, most preferably 55 µm or more from the viewpoint of an increase in the active material capacity per unit area and an increase in energy density of the all-solid lithium battery 10. The upper limit of the thickness is not limited. The oriented positive electrode plate 12 has a thickness of preferably less than 500 µm, more preferably less than 200 µm, further more preferably 150 µm or less, particularly preferably 120 µm or less, particularly more preferably 100 µm or less, most preferably 90 µm or less, 80 µm or less, or 70 µm or less from the viewpoint of restraint in deterioration of battery properties (particularly, an increase in electrical resistance) due to repeated charge/discharge cycles. In addition, the oriented positive electrode plate has dimensions of preferably 5 mm by 5 mm or more, more preferably 10 mm by 10 mm or more. In another expression, the oriented positive electrode plate has an area of preferably at least 25 mm$^2$, more preferably at least 100 mm$^2$.

A face, remote from the solid electrolyte 14, of the oriented positive electrode plate 12 is preferably provided with a positive electrode collector 13. In addition, a face, remote from the solid electrolyte 14, of the negative electrode plate 16 is preferably provided with a negative electrode collector 17. Examples of the material constituting the positive electrode collector 13 and the negative electrode collector 17 include platinum (Pt), platinum (Pt)/palladium (Pd), gold (Au), silver (Ag), aluminum (Al), copper (Cu), and ITO (indium-tin oxide film).

The oriented positive electrode plate 12, the solid electrolyte 14, and the negative electrode plate 16 are accommodated in a container 18. The container 18 may be of any type that can accommodate a unit cell or a laminated battery that a plurality of the unit cells is stacked in series or in parallel. In particular, since an all-solid lithium battery 10 has no risk of electrolyte leakage, the container 18 may be of a relatively simple type, and the cell or battery may be packaged with a cover material. For example, the all-solid lithium battery can be manufactured in a chip form for mounting on an electronic circuit or in a laminate cell form (e.g., a multilayer product of aluminum (Al)/polypropylene (PP)) for low-profile and broad space applications. The positive electrode collector 13 and/or the negative electrode collector 17 may have a structure that can serve as a part of the container 18. In order to further increase the heat resistance, a heat-resistant resin, such as polychlorotrifluoroethylene (PCTFE), tetrafluoroethylene-perfluoroalkylvinyl ether copolymer (PFA), polyimide, and polyamide, may be used in place of polypropylene, and a metal, for example, aluminum or stainless steel, may also be used after ensuring insulation between the cover material and the collector.

The solid electrolyte 14 is a lithium ion conductive material having a melting point lower than the melting point or pyrolytic temperature of the oriented positive electrode plate 12 or the negative electrode plate 16. The solid electrolyte 14 typically has a higher melting point than the operational temperature of the battery, and specifically has a melting point higher than the operational temperature of the battery and not higher than 600° C. Since such a solid electrolyte 14 has a low melting point, the solid electrolyte can melt at a temperature of 100 to 600° C. and permeate into the pores of the oriented positive electrode plate 12 and the pores of the negative electrode plate 16 if desired, as described later, resulting in strong interfacial contact.

The solid electrolyte 14 preferably contains a lithium halide-based material. Examples of the lithium halide-based materials include, preferably at least one selected from the group consisting of $Li_3OCl$, $Li_{(3-x)}M_{x/2}OA$ (where $0 \leq x \leq 0.8$, M is at least one selected from the group consisting of Mg, Ca, Ba and Sr, and A is at least one selected from the group consisting of F, Cl, Br and I), $Li_2(OH)_{1-a}F_aCl$ (where $0 \leq a \leq 0.3$), and $Li_2OHX$ (where X is Cl and/or Br), and more preferably $Li_3OCl$ or $Li_2(OH)_{0.9}F_{0.1}Cl$. Another preferred example of the solid electrolyte 14 includes a lithium halide-based material that has a formula $Li_a(OH)_bF_cBr$ (where $1.85 \leq a \leq 2.3$, $b=a-c-1$, and $0.015 \leq c \leq 0.11$) and an antiperovskite crystal phase, for example, $Li_2(OH)_{0.9}F_{0.1}Br$. Alternatively, the solid electrolyte 14 may be a material other than the lithium halide-based material, for example, that has a formula $xLiOH \cdot yLi_2SO_4$ (where $x+y=1$, and $0.65 \leq x \leq 0.95$), such as $3LiOH \cdot Li_2SO_4$. Each material as described above is advantageous in high ion conductivity.

Besides the above materials, any material that has a low melting point and high ion conductivity can be suitably used in the solid electrolyte 14. A typical form of the solid electrolyte 14 is a solid electrolyte layer. The solid electrolyte layer can be produced by any process. Suitable examples of such processes include vapor phase deposition, such as sputtering and CVD; liquid phase deposition, such as screen printing and spin coating; compression of powder; heating of a raw material to a temperature above the melting point and then solidification of the melt; and heating of compressed raw powder to a temperature above the melting point and then solidification of the melt.

Since the solid electrolyte 14 has a low melting point as described above, the solid electrolyte can melt at a temperature of 100 to 600° C. and permeate into the pores of the oriented positive electrode plate 12 and the pores of the negative electrode plate 16 if desired, as described later, resulting in strong interfacial contact. Accordingly, the solid electrolyte 14 is preferably a melt-solidified material composed of $xLiOH \cdot yLi_2SO_4$ (where $x+y=1$, and $0.65 \leq x \leq 0.95$), preferably a melt-solidified material composed of $Li_3OCl$. The solid electrolyte 14 is preferably at least one melt-solidified material selected from the group consisting of $Li_3OCl$, $Li_{(3-x)}M_{x/2}OA$ (where $0 \le x \le 0.8$, M is at least one selected from the group consisting of Mg, Ca, Ba and Sr, and A is at least one selected from the group consisting of F, Cl, Br and I), $Li_2(OH)_{1-a}F_aCl$ (where $0 \le a \le 0.3$), and $Li_2OHX$ (where X is Cl and/or Br). Alternatively, the solid electrolyte 14 is preferably a melt-solidified material that has a formula $Li_a(OH)_bF_cBr$ (where $1.85 \le a \le 2.3$, $b=a-c-1$, and $0.015 \le c \le 0.11$) and an antiperovskite crystal phase.

The solid electrolyte 14 may have any dimension. The solid electrolyte has a thickness of preferably 0.0005 mm to 1.0 mm, more preferably 0.001 mm to 0.1 mm, further more preferably 0.002 to 0.05 mm in a region other than the permeated portion of the solid electrolyte into the pores of the oriented positive electrode plate 12 and the pores of the negative electrode plate 16 from the viewpoint of high-rate performance during charge/discharge cycles and mechanical strength. The thickness of the solid electrolyte layer may be controlled by a layering process, or with spacers in the case of heating of compressed raw powder to a temperature above the melting point and then solidification of the melt. In other words, the all-solid lithium battery preferably includes spacers for defining the thickness of the solid electrolyte layer 14 between the oriented positive electrode plate 12 and the negative electrode plate 16. The spacers have an electrical resistivity of preferably $1 \times 10^5$ Ω·cm or more, and more preferably $1 \times 10^7$ Ω·cm or more. The spacers are composed of any material, preferably composed of ceramic, such as $Al_2O_3$, MgO, and $ZrO_2$.

The negative electrode plate 16 can intercalate and deintercalate lithium ions at 0.4 V or more based on $Li/Li^+$ and contains Ti. A preferred negative electrode active material satisfying such conditions is an oxide containing at least Ti. Preferred examples of such a negative electrode active material include lithium titanate $Li_4Ti_5O_{12}$ (hereinafter referred to as "LTO"), niobium titanium complex oxide $Nb_2TiO_7$, and titanium oxide $TiO_2$. More preferred examples of the negative electrode active material include LTO and $Nb_2TiO_7$. A further preferred example of the negative electrode active material is LTO. Typical LTO is known to have a spinel structure. Alternatively, LTO may have a different structure during the charging/discharging cycles of the battery. For example, LTO may have two phases consisting of $Li_4Ti_5O_{12}$ having a spinel structure and $Li_7Ti_5O_{12}$ having a rock-salt structure during the charging/discharging cycles, and the reaction continues between the two phases. Thus, LTO may have any structure other than the spinel structure.

The negative electrode plate 16 is preferably composed of a sintered plate containing, for example, LTO or $Nb_2TiO_7$. Since the negative electrode plate composed of a sintered plate contains no binder, high capacity and satisfactory charge/discharge efficiency can be achieved due to a high packing density of the negative-electrode active material, for example, LTO or $Nb_2TiO_7$. The binder in the green sheet will eventually disappear or burn while the green sheet is fired into the negative electrode plate. The LTO sintered plate can be produced by a process disclosed in PTL 2 (JP2015-185337A).

The negative electrode plate 16 may have high compactness or some pores. The pores, if contained, in the negative electrode plate can sufficiently (or uniformly) release the stress generated by the expansion and contraction of crystal lattices accompanied by the intercalation and deintercalation of lithium ions in the charge/discharge cycles, resulting in an effective reduction in cracking at grain boundaries accompanied by repeated charge/discharge cycles.

The negative electrode plate 16 has a porosity of preferably 2 to 40%, more preferably 3 to 30%. Such a porosity range can desirably achieve the stress relaxation by the pores and high energy capacity. The porosity of the negative electrode plate 16 is a volume rate of the pores in the negative electrode plate 16, and can be determined by the analysis of a cross-sectional SEM image of the negative electrode plate 16 similar to the porosity of the oriented positive electrode plate 12 as described above.

In the observation of a cross-section perpendicular to a main face of the negative electrode plate 16, the solid electrolyte 14 occupies 30% or more, preferably 50% or more, more preferably 60% or more, further more preferably 70% or more of the pores contained in the negative electrode plate 12. Such a filling rate can further reduce the battery resistance and improve the high-rate performance during charge/discharge cycles, and further enhance the production yield of batteries. In the use of an inorganic solid electrolyte, a higher filling rate of the electrolyte is preferred in the pores of the positive electrode plate 12. Although the filling rate is ideally 100%, it is practically 99% or less, more practically 95% or less. The filling rate (%) of the electrolyte in the pores can be determined through the analysis of the cross-sectional SEM image of the negative electrode plate 16, as in the analysis of the oriented positive electrode plate 12 as described above.

In the observation of a cross-section perpendicular to a main face of the negative electrode plate 16, the solid electrolyte 14 is in contact with preferably at least 30%, more preferably at least 40%, further more preferably at least 50% of the outer peripheral length of the pores contained in the negative electrode plate 12. Such a contact rate can further reduce the battery resistance and improve the high-rate performance during charge/discharge cycles, and further enhance the production yield of batteries. Accordingly, the contact area further increases between the solid electrolyte and the negative electrode plate. In the use of an inorganic solid electrolyte, a higher contact rate of the electrolyte is preferred in the pores of the negative electrode plate 16. Although the contact rate is ideally 100%, it is practically 99% or less, more practically 95% or less. The contact rate (%) between the outer periphery of the pores and the solid electrolyte can be determined through the analysis of the cross-sectional SEM image of the negative electrode plate 16, as in the analysis of the oriented positive electrode plate 12 as described above.

The negative electrode plate 16 has a thickness of 25 μm or more, preferably 30 μm or more, more preferably 40 μm or more, particularly preferably 50 μm or more, mostly preferably 55 μm or more from the viewpoint of an increase in the active material capacity per unit area and an increase in energy density of the all-solid lithium battery 10. The thickness of the negative electrode plate 16 may have any upper limit. The negative electrode plate 16 has a thickness of preferably 400 μm or less, more preferably 300 μm or less to reduce the deterioration of the battery properties accompanied by repeated charge/discharge cycles (particularly, due to an increase in electric resistance). In addition, the negative electrode plate 16 has dimensions of preferably 5 mm by 5 mm or more, more preferably 10 mm by 10 mm or more. In another expression, the negative electrode plate 16 has an area of preferably at least 25 $mm^2$, more preferably at least 100 $mm^2$.

As described above, the oriented positive electrode plate 12 is preferably a $LiCoO_2$ (LCO) sintered plate, and the negative electrode plate 16 is preferably a $Li_4Ti_5O_{12}$ (LTO) sintered plate. In particular, an averaged value of the orientation angles, i.e., a mean orientation angle of more than 0° to 30° in the LCO oriented positive electrode plate causes no expansion and contraction to occur in the main face direction during charge/discharge cycles, and the LTO negative electrode plate and the solid electrolyte also do not expand and contract during the charge/discharge cycles, resulting in no stress generation (in particular, the stress at the interface between the oriented positive electrode plate 12 or negative electrode plate 16 and the solid electrolyte 14) and stable charge and discharge. In the use of $Nb_2TiO_7$ sintered plate in the negative electrode plate 16, primary grains constituting the $Nb_2TiO_7$ sintered plate are preferably oriented to reduce the expansion and contraction.

Although being capable of charging or discharging at room temperature, the all-solid lithium battery of the present invention preferably charges or discharges at 100° C. or more. A temperature of 100° C. or more can achieve rapid charge/discharge at a high cycle capacity retention rate. In other words, a temperature of 100° C. or more enables the all-solid lithium battery 10 to rapidly charge or discharge. That is, the all-solid lithium battery can run stably at a high rate at this temperature. Repeated charge/discharge can retain high capacity. In other words, a high cycle capacity retention rate can be achieved. The operational temperature of the all-solid lithium battery during the charge/discharge cycles is preferably 100° C. or more, more preferably 100 to 300° C., further preferably 100 to 200° C., particularly preferably 100 to 150° C. Examples of a heating means achieving such an operational temperature include various heaters and exothermic devices. Preferred examples of the heating means are electroconductive ceramic heaters. In other words, the all-solid lithium battery of this embodiment is preferably provided as a secondary battery system including a heating means.

Production of all-Solid Battery

The inventive all-solid lithium battery 10 is preferably produced as follows: Solid electrolyte powder containing at least one selected from the group consisting of $xLiOH \cdot yLi_2SO_4$, $Li_3OCl$, $Li_{(3-x)}M_{x/2}OA$, $Li_2(OH)_{1-a}F_aCl$, $Li_2OHX$, and $Li_a(OH)_bF_cBr$ is placed on the oriented positive electrode plate 12 (or the negative electrode plate 16). The negative electrode plate 16 (or the oriented positive electrode plate 12) is placed on the solid electrolyte powder. The negative electrode plate 16 is pressed toward the oriented positive electrode plate 12 (or the oriented positive electrode plate is pressed toward the negative electrode plate) at 100 to 600° C., preferably 200 to 500° C., more preferably 250 to 450° C. to melt the solid electrolyte powder and permeate the melt into the pores in the oriented positive electrode plate. This press treatment is performed by any process that can generate a load, for example, a mechanical load or weight. Subsequently, the oriented positive electrode plate 12, the molten electrolyte, and the negative electrode plate 16 are spontaneously or controllably cooled to solidify the molten electrolyte into the solid electrolyte 14.

As described above, the all-solid lithium battery 10 may include spacers that define the thickness of the solid electrolyte layer 14 between the oriented positive electrode plate 12 and the negative electrode plate 16. This configuration is preferably achieved by disposing spacers along with the solid electrolyte powder between the oriented positive electrode plate 12 and the negative electrode plate 16.

EXAMPLES

The present invention will be described in more detail by the following examples. In the following examples, $LiCoO_2$ is abbreviated as "LCO" and $Li_4Ti_5O_{12}$ is abbreviated as "LTO".

Example 1

(1) Production of Positive Electrode Plate (1a) Preparation of LCO Green Sheet $Co_3O_4$ powder (available from Seido Chemical Co., Ltd., a mean particle size of 0.9 μm) and $Li_2CO_3$ powder (available from The Honjo Chemical Corporation) were weighed into a Li/Co molar ratio of 1.02, mixed, and then heated at 750° C. for five hours. The resultant powder was pulverized in a pot mill into a volume-based D50 of 0.4 μm, to give LCO powder composed of platy particles. The resultant LCO powder (100 parts by weight), a dispersive medium (toluene:2-propanol=1:1) (100 parts by weight), a binder (polyvinyl butyral: Product No. BM-2, available from Sekisui Chemical Co., Ltd.) (10 parts by weight), a plasticizer (di-2-ethylhexyl phthalate (DOP), available from Kurogane Kasei Co., Ltd.) (4 parts by weight), and a dispersant (product name: RHEODOL SP-030, available from Kao Corporation) (2 parts by weight) were mixed. The mixture was defoamed by stirring under reduced pressure to prepare an LCO slurry with a viscosity of 4000 cP. The viscosity was measured with an LVT viscometer available from Brookfield. The slurry was molded into an LCO green sheet onto a PET film by a doctor blade process. The dried thickness of the LCO green sheet was 50 μm.

(1b) Preparation of $Li_2CO_3$ Green Sheet (Excess-Lithium Source)

$Li_2CO_3$ raw material powder (volume-based particle diameter D50: 2.5 μm, available from The Honjo Chemical Corporation) (100 parts by weight), a binder (poly(vinyl butyral): Product No. BM-2, available from Sekisui Chemical Co., Ltd.) (5 parts by weight), a plasticizer di-2-ethylhexyl phthalate (DOP), available from Kurogane Kasei Co., Ltd.) (2 parts by weight), and a dispersant (RHEODOL SP-030, available from Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer available from Brookfield. The $Li_2CO_3$ slurry was molded into a $Li_2CO_3$ green sheet on a PET film by a doctor blade process. The dried thickness of the $Li_2CO_3$ green sheet was adjusted such that the Li/Co molar ratio of the Li content in the $Li_2CO_3$ green sheet to the Co content in the LCO green sheet was 0.2.

(1c) Preparation of Sintered LCO Plate

The LCO green sheet was separated from the PET film, and was cut into a 50 mm square. The cut piece was placed on the center of a bottom magnesia setter (dimensions: 90 mm square, height: 1 mm). The LCO green sheet was heated to 600° C. at a heating rate of 200° C./h, and was degreased for three hours. The LCO green sheet was then kept at 900° C. for three hours to calcine the LCO green sheet. The dried $Li_2CO_3$ green sheet was cut into a size such that the Li/Co molar ratio of the Li content in the $Li_2CO_3$ green sheet to the Co content in the calcined LCO plate was 0.5. The cut piece of the $Li_2CO_3$ green sheet, as an excess-lithium source, was placed on the calcined LCO plate, and a porous top magnesia setter was placed thereon. The calcined LCO plate and the green sheet piece disposed between the top and bottom setters were placed into an alumina sheath of a 120 mm square (available from Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 800° C. at 200° C./h, and was kept for five hours. The laminate was then heated to 900° C. at 200° C./h, and was kept for 24 hours to fire. After the firing, the fired laminate was cooled to room temperature, and was removed from the alumina sheath. Thus, the sintered LCO plate was yielded as a positive electrode plate. An Au film (a thickness of 100 nm) as a current collecting layer was deposited by sputtering on a face, in contact with the bottom setter, of the sintered LCO plate, and the LCO positive electrode plate was then cut into a 10 mm by 10 mm square by a laser process.

(2) Production of Negative Electrode Plate (2a) Preparation of LTO Green Sheet

LTO powder (a volume-based D50 particle size of 0.06 µm, available from Sigma-Aldrich Japan) (100 parts by weight), a dispersion medium (toluene: 2-propanol=1:1) (100 parts by weight), a binder (poly(vinyl butyral): product number BM-2, available from Sekisui Chemical Co., Ltd.) (20 parts by weight), a plasticizer (DOP: di(2-ethylhexyl) phthalate, available from Kurogane Kasei Co., Ltd.) (4 parts by weight), and a dispersant (product name: Rheodor SP-030, available from Kao Corporation) (2 parts by weight) were mixed. The resultant mixture of raw materials for the negative electrode was stirred and defoamed under reduced pressure, and then the viscosity was adjusted to 4000 cP to prepare LTO slurry. The viscosity was measured with an LVT viscometer available from Brookfield. The resulting slurry was applied onto a PET film by a doctor blade process into an LTO green sheet. The dried thickness of LTO green sheet was adjusted such that the fired thickness was 50 µm.

(2b) Firing of LTO Green Sheet

The resultant green sheet was cut into a 25 mm square with a box knife and placed onto an embossed zirconia setter. The green sheet on the setter was placed into an alumina sheath and held at 500° C. for five hours, then heated at a rate of 200° C./h and fired at 800° C. for five hours. An Au film (a thickness of 100 nm) as a current collecting layer was deposited on a face, in contact with the setter, of the resultant LTO sintered plate by sputtering, and the LTO sintered plate was then cut into a 10 mm by 10 mm by a laser process.

(3) Production of Solid Electrolyte

An aqueous raw material solution was prepared by dissolving of LiOH (4.790 g) and LiCl (4.239 g) into a small amount of deionized water. Each amount of these precursors was determined such that the stoichiometric ratio corresponded to the reactant formula: $Li_3OCl+H_2O$. Most of the water was removed with a rotary evaporator and a bath at about 90° C. The resulting solid was placed in an alumina boat. The boat was disposed in an electric furnace and heated in vacuum at about 280° C. for about 48 hours to give $Li_3OCl$ powder, which is a reaction product, as a solid electrolyte.

(4) Preparation of Battery

The $Li_3OCl$ powder was placed on the positive electrode plate; the positive electrode plate and the $Li_3OCl$ powder were heated at 400° C. on a hot plate; and the negative electrode plate was placed while being pressed from the top. At this time, the $Li_3OCl$ powder was melted followed by solidification, and a solid electrolyte layer having a thickness of 20 µm was thereby formed. The unit cells composed of the positive electrode plate, the solid electrolyte and the negative electrode plate were used to prepare 100 laminated batteries.

(5) Evaluation

The following properties were evaluated on the LCO positive electrode plate synthesized in Procedure (1), the LTO negative electrode plate synthesized in Procedure (2), and the battery prepared in Procedure (4).

<Porosity>

Each of the LCO positive electrode plate and the LTO negative electrode plate was polished with a cross section polisher (CP) (IB-15000CP, available from JEOL Ltd.), and the resultant cross-section of the electrode plate was observed with a SEM (JSM6390LA, available from JEOL Ltd.) at a 1000-fold field of view (125 µm by 125 µm). The image analysis was then performed, and the porosity (%) of each electrode plate was determined through dividing the area of all the pores by the total area of each plate and multiplying the resulting value by 100.

<Mean Orientation Angle of Primary Grains>

The sintered LCO plate was polished with a cross section polisher (CP) (IB-15000CP, available from JEOL Ltd.), and the resultant cross-section of the positive electrode plate (cross-section perpendicular to a main face of the positive electrode plate) was subjected to the EBSD measurement at a 1000-fold field of view (125 µm by 125 µm) to give an EBSD image. This EBSD measurement was performed using a Schottky field emission scanning electron microscope (model JSM-7800F, available JEOL Ltd.). For all grains identified in the resultant EBSD image, the angle defined by the (003) plane of the primary grain and the main face of the positive electrode plate (that is, the tilt of the crystal orientation from the (003) plane) is determined as a tilt angle. The mean value of the angles was determined as a mean orientation angle (i.e., a mean tilt angle) of the primary grains.

<Filling Rate of Electrolyte in Pores>

The prepared battery was polished with a cross section polisher (CP) (IB-15000CP, available from JEOL Ltd.), and the resultant cross-section of the positive electrode plate or negative electrode plate was observed with a SEM (JSM6390LA, available from JEOL Ltd.) and analyzed with an EDX at a 1000-fold field of view (125 µm by 125 µm). The image analysis was then performed, and the area of the pores filled with the solid electrolyte and the area of all pores were measured, the area of all pores being the total area of the area of the pores filled with the solid electrolyte and the area of the pores not filled with the solid electrolyte. The filling rate of electrolyte (%) in the pores was determined through dividing the area of the pores filled with the solid electrolyte by the area of all the pores and multiplying the resulting value by 100.

<Contact Rate Between Outer Periphery of Pores and Solid Electrolyte>

The prepared battery was polished with a cross section polisher (CP) (IB-15000CP, available from JEOL Ltd.), and the resultant cross-section of the positive electrode plate or negative electrode plate was observed with a SEM (JSM6390LA, available from JEOL Ltd.) and analyzed with an EDX at a 1000-fold field of view (125 µm by 125 µm). The image analysis was then performed, and the contact length between the grains constituting the outer periphery of the pores (i.e., grains adjacent to the pores) and the solid electrolyte and the outer peripheral length of the pores was measured, the outer peripheral length being the total length of the contact length between the grains constituting the outer periphery of pores and the solid electrolyte, and the non-contact length between the grains constituting the outer periphery of pores and the solid electrolyte. The contact rate (%) between the outer periphery of pores and the solid electrolyte was determined thorough dividing the contact length between the grains constituting the outer periphery of pores and the solid electrolyte by the outer peripheral length of pores and multiplying the resulting value by 100.

<Contact Rate Between Planes Other than (003) Plane and Solid Electrolyte at Surface of Pores>

The prepared battery was polished with a cross section polisher (CP) (IB-15000CP, available from JEOL Ltd.), and the resultant cross-section of the positive electrode plate was observed with a SEM (JSM6390LA, available from JEOL Ltd.), analyzed with an EDX and measured with an EBSD at a 1000-fold field of view (125 µm by 125 µm). The EBSD measurement was performed as in the measurement of the mean orientation angle of primary grains as described above. Whether the crystal planes of grains exposed at the surface of pores are the (003) planes or the planes other than the (003) plane was determined, and the first outer peripheral length of pores where the solid electrolyte is in contact with the planes other than the (003) plane and the second outer peripheral length of pores where the planes other than the (003) plane are exposed are measured based on the EBSD results. The contact rate (%) between the planes other than (003) plane and the solid electrolyte at the surface of pores was determined through dividing the first outer peripheral length of pores where the solid electrolyte is in contact with the planes other than the (003) plane by the second outer peripheral length of pores where the planes other than the (003) plane are exposed and multiplying the resulting value by 100.

<Production Yield of Batteries>

Each battery resistance of 100 prepared batteries was measured by AC impedance spectroscopy using an electrochemical measurement system SP-150 available from Bio-Logic. The minimum value among 100 batteries was defined as the reference resistance. The batteries having a resistance value within ten times the reference resistance were determined to be non-defective products, and the number of non-defective products was defined as the production yield of batteries.

<Cycle Capacity Retention>

For the batteries determined to be non-defective products, the cycle capacity retention of the battery was measured in a potential range of 2.7 V to 1.5 V at a battery operational temperature of 100° C. in accordance with the following procedures.

(i) The battery was charged at a rate of 0.2 C under a constant current until the battery voltage reached 2.7 V, was charged under a constant voltage until the current value reached a rate of 0.02 C, and was then discharged at a rate of 0.2 C until the voltage reached 1.5 V. This charge/discharge cycle was repeated three times in total to measure the discharge capacities. The averaged value was defined as an initial discharge capacity.

(ii) The battery was charged and discharged 30 times in total at a charge rate of 0.5 C and a discharge rate of 0.5 C, respectively.

(iii) The battery was charged at a rate of 0.2 C under a constant current until the battery voltage reached 2.7 V, was charged under a constant voltage until the current reached a rate of 0.02 C, and then was discharged at a rate of 0.2 C until the voltage reached 1.5 V. This charge/discharge cycle was repeated three times in total to measure the discharge capacities. The averaged value was defined as a post-cycle discharge capacity.

(iv) The ratio of the post-cycle discharge capacity measured in Procedure (iii) to the initial discharge capacity measured in Procedure (i) was calculated, and the ratio was multiplied by 100 to determine the capacity retention (%) after charge/discharge cycles.

Example 2

Batteries were prepared and evaluated as in Example 1 except that a $Li_2CO_3$ green cut sheet was not placed on the LCO calcined plate in Procedure (1c).

Example 3

Batteries were prepared and evaluated as in Example 1 except that the keeping at 800° C. for five hours was not performed during the firing in Procedure (1c) and the heating was performed at 330° C. in Procedure (4).

Example 4 (Comparative)

Batteries were prepared and evaluated as in Example 1 except that the $Co_3O_4$ powder having a D50 particle size of 0.3 µm was used in Procedure (1a).

Example 5 (Comparative)

Batteries were prepared and evaluated as in Example 1 except that the Li/Co ratio was 0.7 in Procedure (1b) and the firing time at 900° C. was 96 hours in Procedure (1c).

Example 6

Batteries were prepared and evaluated as in Example 1 except that positive electrode plates and negative electrode plates were produced as follows:

(Production of Positive Electrode Plate)

In Procedure (1c), an LCO sintered plate was produced as in Example 1 except that the Li/Co ratio, which is the molar ratio of the Li content in the $Li_2CO_3$ green sheet to the Co content in the LCO calcined plate, was 0.1 and the firing was performed at a maximum temperature of 850° C.

(Production of Negative Electrode Plate)

In Procedure (2a), an LTO sintered plate was produced as in Example 1 except that another LTO powder (a volume-based D50 particle size of 0.7 µm, available from Ishihara Sangyo Co., Ltd.) was used in the LTO raw powder.

Example 7

Batteries were prepared and evaluated in Example 1 except that a $LiOH \cdot Li_2SO_4$-based powder produced as follows was used in the solid electrolyte, and the batteries were prepared as follows:

(Production of Solid Electrolyte Powder)

Commercially available LiOH (purity≥98.0%) and $Li_2SO_4$ (purity≥98.0%) were provided. These raw materials are weighed into a $LiOH:Li_2SO_4$ molar ratio of 3.0:1.0 and mixed in an Ar atmospheric glove box having a dew point of −50° C. or lower. The mixture was placed in a glass tube in an Ar atmosphere and melted by heating at 430° C. for two hours. The glass tube was then placed into water and kept for ten minutes, and the melt was quenched to form a solidified material. The solidified material was then pulverized in a mortar in an Ar atmosphere to give $3LiOH \cdot Li_2SO_4$ powder, which is a solid electrolyte.

(Preparation of Battery)

A LiOH·Li$_2$SO$_4$-based powder containing ZrO$_2$ beads (5 wt %) having a diameter of 30 μm was placed on the positive electrode plate, and the negative electrode plate was then placed on the powder. A weight (15 g) was then placed on the negative electrode plate and the laminate was heated at 400° C. for 45 minutes in an electric furnace. In this heating, the LiOH·Li$_2$SO$_4$-based powder was melted followed by solidification to thus form a solid electrolyte layer having a thickness of 40 μm. The resulting unit cells composed of the positive electrode plate, the solid electrolyte, and the negative electrode plate were used to produce 100 laminated batteries.

Example 8

Batteries were prepared and evaluated as in Example 7 except that positive and negative electrode plates prepared as in Example 6 were used.

Example 9

Batteries were prepared and evaluated as in Example 7 except that positive electrode plates prepared as in Example 2 were used and the negative electrode plates were produced as follows:
(Production of Negative Electrode Plate)
An LTO sintered plate was produced as in Example 1 except that the firing was performed for five hours at a maximum temperature of 775° C. in Procedure (2b).

Example 10

Batteries were prepared and evaluated as in Example 8 except that the thickness of the LCO sintered plate was 200 μm and the thickness of the LTO sintered plate was 200 μm.

Example 11 (Comparative)

Batteries were prepared and evaluated as in Example 7 except that positive and negative electrode plates were produced as in Example 4.

Example 12 (Comparative)

Batteries were prepared and evaluated as in Example 7 except that positive and negative electrode plates were produced as in Example 5.

Example 13

Batteries were prepared and evaluated as in Example 7 except that positive and negative electrode plates were produced as in Example 6, and Li(OH)$_{0.9}$F$_{0.1}$Cl-based powder produced as follows was used in the solid electrolyte, and the solid electrolyte powder was heated at 350° C. for 45 minutes in Procedure (4).
(Production of Solid Electrolyte Powder)
Commercially available LiOH (purity≥98.0%), LiCl (purity≥99.9%) and LiF (purity=99.9%) were provided as raw materials. In an Ar atmospheric glove box having a dew point of −50° C. or lower, each raw material was weighed into a LiOH:LiCl:LiF molar ratio of 0.9:1.0:0.1 and mixed. The resultant mixed powder was transferred into a crucible made of alumina (purity=99.7%), and the crucible was placed in a quartz tube and sealed with a flange. This quartz tube was fixed in a tubular furnace and heated at 350° C. for 30 minutes. During this heating, an Ar gas having a dew point of −50° C. or lower was injected through a gas inlet at the flange and discharged from a gas outlet, and the mixed powder was stirred. After cooling, the gas inlet and the gas outlet were closed, and the quartz tube was returned into the Ar atmospheric glove box having a dew point of −50° C. or lower and the crucible was recovered. The reactant composite was collected from the crucible and pulverized in a mortar to give Li$_2$(OH)$_{0.9}$F$_{0.1}$Cl powder, which is a solid electrolyte. In this process, the heating temperature and time in an Ar gas atmosphere can be modified as appropriate. In general, the heating temperature should be 250° C. to 600° C., and the heating time should be 0.1 hours or longer.

Example 14

Batteries were prepared and evaluated as in Example 7 except that positive and negative electrode plates were produced as in Example 6, Li(OH)$_{0.9}$F$_{0.1}$Br-based powder produced as follows was used in the solid electrolyte, and the solid electrolyte powder was heated at 350° C. for 45 minutes in Procedure (4).
(Production of Solid Electrolyte Powder)
Commercially available LiOH (purity≥98.0%), LiBr (purity≥99.9%) and LiF (purity=99.9%) were provided as raw materials. In an Ar atmospheric glove box having a dew point of −50° C. or lower, each raw material was weighed into a LiOH:LiBr:LiF molar ratio of 0.9:1.0:0.1 and mixed. The resultant mixed powder was transferred into a crucible made of alumina (purity=99.7%), and the crucible was placed in a quartz tube, and sealed with a flange. This quartz tube was fixed in a tubular furnace and heated at 350° C. for 30 minutes. During this heating, an Ar gas having a dew point of −50° C. or lower was injected through a gas inlet at the flange and discharged from a gas outlet, and the mixed powder was stirred. After cooling, the gas inlet and the gas outlet were closed, and the quartz tube was returned into the Ar atmospheric glove box having a dew point of −50° C. or lower and the crucible was recovered. The reactant composite was collected from the crucible and pulverized in a mortar to give Li$_2$(OH)$_{0.9}$F$_{0.1}$Br powder, which is a solid electrolyte. In this process, the heating temperature and time in an Ar gas atmosphere can be changed as appropriate. In general, the heating temperature should be 250° C. to 600° C., and the heating time should be 0.1 hours or longer.

Example 15

Batteries were prepared and evaluated as in Example 8 except that positive electrode plates were produced as follows:
(1) Production of Positive Electrode Plate
(1a) Preparation of Li(Co$_{0.90}$Ni$_{0.05}$Mn$_{0.05}$)O$_2$ Green Sheet
Commercially available Co$_3$O$_4$ powder (a mean particle size D50 of 0.9 μm), Li$_2$CO$_3$ powder, Ni(OH)$_2$ powder, and MnCO$_3$ powder were weighed into a molar ratio of Li(Co$_{0.90}$Ni$_{0.05}$Mn$_{0.05}$)O$_2$ and mixed. The mixture was heated at 800° C. for five hours to give calcined powder. The calcined powder was pulverized in a pot mill into a mean particle size D50 of 1 μm. The resultant powder (100 parts by weight), a dispersive medium (toluene:2-propanol=1:1) (100 parts by weight), a binder (10 parts by weight), a plasticizer (4 parts by weight), and a dispersant (2 parts by weight) were mixed. The resultant mixture was defoamed by stirring under reduced pressure to prepare an Li(Co,Ni,Mn)O$_2$ slurry with an adjusted viscosity. The slurry as prepared above was shaped into a green sheet onto a PET film by a doctor blade process. The thickness of the LCO green sheet was adjusted such that the fired thickness was 50 μm.

(1b) Preparation of $Li(Co_{0.90}Ni_{0.05}Mn_{0.05})O_2$ Sintered Plate

The $Li(Co,Ni,Mn)O_2$ green sheet separated from the PET film was cut out. A cut piece of green sheet was placed on the center of a bottom magnesia setter, and a porous top magnesia setter was placed on the piece. The cut piece of green sheet sandwiched between two setters was placed in an alumina sheath. In this step, the alumina sheath was loosely capped with a small gap. The resultant laminate was heated to 600° C. at a rate of 200° C./h, degreased for three hours, and then fired at 800° C. for 20 hours to give a $Li(Co,Ni,Mn)O_2$ sintered plate. The resulting sintered plate was then cut into a 10 mm by 10 mm by a laser process to produce a positive electrode plate.

Results

The results of Examples 1 to 15 are shown in Tables 1A and 1B.

TABLE 1A

| | Positive electrode plate | | | Negative electrode plate | | | Pores in positive electrode plate and solid electrolyte | | |
|---|---|---|---|---|---|---|---|---|---|
| | Composition[X] | Mean orientation angle of primary grains (°) | Porosity (%) | Composition[X] | Porosity (%) | Solid electrolyte Composition | Filling rate of solid electrolyte in pores (%) | Contact rate of solid electrolyte with outer periphery of pores (%) | Contact rate of solid electrolyte with planes other than (003) plane at surface of pores (%) |
| Ex. 1 | LCO | 15 | 10 | LTO | 10 | $Li_3ClO$ | 70 | 50 | 30 |
| Ex. 2 | LCO | 15 | 45 | LTO | 10 | $Li_3ClO$ | 70 | 50 | 30 |
| Ex. 3 | LCO | 15 | 10 | LTO | 10 | $Li_3ClO$ | 30 | 30 | 20 |
| Ex. 4* | LCO | Unoriented (random) | 10 | LTO | 10 | $Li_3ClO$ | 70 | 50 | 30 |
| Ex. 5* | LCO | 15 | 3 | LTO | 10 | $Li_3ClO$ | 70 | 50 | 30 |
| Ex. 6 | LCO | 15 | 30 | LTO | 30 | $Li_3ClO$ | 70 | 50 | 30 |
| Ex. 7 | LCO | 15 | 10 | LTO | 10 | $3LiOH \cdot Li_2SO_4$ | 71 | 52 | 32 |
| Ex. 8 | LCO | 15 | 30 | LTO | 30 | $3LiOH \cdot Li_2SO_4$ | 93 | 85 | 39 |
| Ex. 9 | LCO | 15 | 45 | LTO | 35 | $3LiOH \cdot Li_2SO_4$ | 99 | 90 | 40 |
| Ex. 10 | LCO | 15 | 30 | LTO | 30 | $3LiOH \cdot Li_2SO_4$ | 89 | 82 | 35 |
| Ex. 11* | LCO | Unoriented (random) | 10 | LTO | 10 | $3LiOH \cdot Li_2SO_4$ | 64 | 52 | 42 |
| Ex. 12* | LCO | 15 | 3 | LTO | 10 | $3LiOH \cdot Li_2SO_4$ | 45 | 32 | 24 |
| Ex. 13 | LCO | 15 | 30 | LTO | 30 | $Li_2(OH)_{0.9}F_{0.1}Cl$ | 85 | 71 | 37 |
| Ex. 14 | LCO | 15 | 30 | LTO | 30 | $Li_2(OH)_{0.9}F_{0.1}Br$ | 86 | 75 | 35 |
| Ex. 15 | Li(Co,Ni,Mn)O | 15 | 20 | LTO | 30 | $3LiOH \cdot Li_2SO_4$ | 82 | 68 | 35 |

*Comparative examples
[X]LCO indicates $LiCoO_2$; Li(Co,Ni,Mn)O indicates $Li(Co_{0.90}Ni_{0.05}Mn_{0.05})O_2$; and LTO indicates $Li_4Ti_5O_{12}$.

TABLE 1B

| | Pores in negative electrode plate and solid electrolyte | | Evaluations of batteries | |
|---|---|---|---|---|
| | Filling rate of solid electrolyte in pores (%) | Contact rate of solid electrolyte with outer periphery of pores (%) | Yield of batteries (%) | Cycle capacity retention (%) |
| Ex. 1 | 70 | 50 | 100 | 95 |
| Ex. 2 | 70 | 50 | 100 | 98 |
| Ex. 3 | 30 | 30 | 70 | 92 |
| Ex. 4* | 70 | 50 | 90 | 60 |
| Ex. 5* | 70 | 50 | 25 | 80 |
| Ex. 6 | 70 | 50 | 100 | 96 |
| Ex. 7 | 72 | 51 | 92 | 90 |
| Ex. 8 | 92 | 75 | 98 | 95 |
| Ex. 9 | 99 | 82 | 98 | 96 |
| Ex. 10 | 88 | 72 | 96 | 92 |
| Ex. 11* | 71 | 50 | 92 | 58 |
| Ex. 12* | 72 | 51 | 30 | 65 |
| Ex. 13 | 88 | 52 | 93 | 90 |
| Ex. 14 | 87 | 50 | 94 | 91 |
| Ex. 15 | 92 | 75 | 95 | 90 |

*Comparative examples (Measurement of Melting Point of Solid Electrolytes)

TG-DTA measurements of $Li_3ClO$, $3LiOH \cdot Li_2SO_4$, $Li_2(OH)_{0.9}F_{0.1}Cl$, and $Li_2(OH)_{0.9}F_{0.1}Br$ used in Examples 1 to 15 described above were performed with Thermo Plus TG8120 available from Rigaku Corporation in an Ar atmosphere. The heating rate was 10° C./min. As a result, the melting points of $Li_3ClO$, $3LiOH \cdot Li_2SO_4$, $Li_2(OH)_{0.9}F_{0.1}Cl$, and $Li_2(OH)_{0.9}F_{0.1}Br$ were 320, 360, 285, and 244° C., respectively.

What is claimed is:

1. An all-solid lithium battery comprising:
an oriented positive electrode plate that is a lithium complex oxide sintered plate having a porosity of 10 to 50%, wherein the lithium complex oxide sintered plate contains a plurality of primary grains composed of lithium complex oxide, and the primary grains are oriented at a mean orientation angle of more than 0° to 30° to a main face of the oriented positive electrode plate;

a negative electrode plate that is a sintered plate containing Ti and capable of intercalating and deintercalating lithium ions at 0.4 V or higher (vs. Li/Li$^+$); and a solid electrolyte having a melting point lower than a melting point or pyrolytic temperature of the oriented positive electrode plate or the negative electrode plate, wherein at least 30% of pores in the oriented positive electrode plate is filled with the solid electrolyte in an observation of a cross-section perpendicular to a main face of the oriented positive electrode plate.

2. The all-solid lithium battery according to claim 1, wherein the melting point of the solid electrolyte is higher than an operational temperature of batteries and is 600° C. or lower.

3. The all-solid lithium battery according to claim 1, wherein the solid electrolyte is represented by a formula xLiOH·yLi$_2$SO$_4$, where x+y=1, and 0.6≤x≤0.95.

4. The all-solid lithium battery according to claim 1, wherein the solid electrolyte comprises at least one selected from the group consisting of Li$_3$OCl, Li$_{(3-x)}$M$_{x/2}$OA, where 0≤x≤0.8, M is at least one selected from the group consisting of Mg, Ca, Ba and Sr, and A is at least one selected from the group consisting of F, Cl, Br and I, Li$_2$(OH)$_{1-a}$F$_a$Cl, where 0≤a≤0.3, and Li$_2$OHX where X is Cl and/or Br.

5. The all-solid lithium battery according to claim 1, wherein the solid electrolyte is represented by a formula Li$_a$(OH)$_b$F$_c$Br, where 1.8≤a≤2.3, b=a−c−1, and 0.01≤c≤0.11 and comprises an antiperovskite crystal phase.

6. The all-solid lithium battery according to claim 1, wherein at least 70% of the pores in the oriented positive electrode plate is filled with the solid electrolyte.

7. The all-solid lithium battery according to claim 1, wherein at least 30% of an outer peripheral length of pores in the oriented positive electrode plate is in contact with the solid electrolyte in an observation of a cross-section perpendicular to a main face of the oriented positive electrode plate.

8. The all-solid lithium battery according to claim 7, wherein at least 50% of the outer peripheral length of pores in the oriented positive electrode plate is in contact with the solid electrolyte.

9. The all-solid lithium battery according to claim 1, wherein at least 20% of planes other than the (003) plane of the lithium complex oxide is in contact with the solid electrolyte at the surface of pores in the oriented positive electrode plate in an observation of a cross-section perpendicular to a main face of the oriented positive electrode plate.

10. The all-solid lithium battery according to claim 9, wherein at least 30% of planes other than the (003) plane of the lithium complex oxide is in contact with the solid electrolyte at the surface of pores in the oriented positive electrode plate.

11. The all-solid lithium battery according to claim 1, wherein the negative electrode plate has a porosity of 2 to 40%.

12. The all-solid lithium battery according to claim 11, wherein at least 30% of pores in the negative electrode plate is filled with the solid electrolyte in an observation of a cross-section perpendicular to a main face of the negative electrode plate.

13. The all-solid lithium battery according to claim 12, wherein at least 70% of pores in the negative electrode plate is filled with the solid electrolyte.

14. The all-solid lithium battery according to claim 11, wherein at least 30% of an outer peripheral length of pores in the negative electrode plate is in contact with the solid electrolyte in an observation of a cross-section perpendicular to a main face of the negative electrode plate.

15. The all-solid lithium battery according to claim 14, wherein at least 50% of the outer peripheral length of pores in the negative electrode plate is in contact with the solid electrolyte.

16. The all-solid lithium battery according to claim 1, wherein the solid electrolyte is a melt-solidified material of xLiOH·yLi$_2$SO$_4$, where x+y=1, and 0.6≤x≤0.95.

17. The all-solid lithium battery according to claim 1, wherein the solid electrolyte is at least one melt-solidified material selected from the group consisting of Li$_3$OCl, Li$_{(3-x)}$M$_{x/2}$OA, where 0≤x≤0.8, M is at least one selected from the group consisting of Mg, Ca, Ba and Sr, and A is at least one selected from the group consisting of F, Cl, Br and I, Li$_2$(OH)$_{1-a}$F$_a$Cl, where 0≤a≤0.3, and Li$_2$OHX, where X is Cl and/or Br.

18. The all-solid lithium battery according to claim 1, wherein the solid electrolyte is a melt-solidified material that is represented by a formula Li$_a$(OH)$_b$F$_c$Br, where 1.8≤a≤2.3, b=a−c−1, and 0.01≤c≤0.11 and comprises an antiperovskite crystal phase.

19. The all-solid lithium battery according to claim 1, which is charged and discharged at a temperature of 100° C. or higher.

20. The all-solid lithium battery according to claim 1, further comprising spacers that define the thickness of the solid electrolyte layer between the oriented positive electrode plate and the negative electrode plate.

21. The all-solid lithium battery according to claim 20, wherein the spacers have an electrical resistivity of 1×10$^5$ Ω·cm or more.

22. The all-solid lithium battery according to claim 20, wherein the spacers are composed of ceramic.

23. A method of producing the all-solid lithium battery according to claim 1, comprising the steps of:

placing solid electrolyte powder having a melting point lower than the melting point or pyrolytic temperature of the oriented positive electrode plate or the negative electrode plate on one of the oriented positive electrode plate and the negative electrode plate;

placing the other of the oriented positive electrode plate and the negative electrode plate on the solid electrolyte powder;

pressing the negative electrode plate toward the oriented positive electrode plate, or the oriented positive electrode plate toward the negative electrode plate at 100 to 600° C. to melt the solid electrolyte powder and permeate the melt into the pores in the oriented positive electrode plate and/or the negative electrode plate; and spontaneously or controllably cooling the oriented positive electrode plate, the molten electrolyte and the negative electrode plate to solidify the molten electrolyte.

24. The method according to claim 23, wherein the all-solid lithium battery includes spacers that define the thickness of the solid electrolyte layer between the oriented positive electrode plate and the negative electrode plate, and the spacers are sandwiched along with the solid electrolyte powder between the oriented positive electrode plate and the negative electrode plate in the step of placing the negative electrode plate or the positive electrode plate on the solid electrolyte powder.

* * * * *